US012555564B2

(12) United States Patent
Kulkarni et al.

(10) Patent No.: US 12,555,564 B2
(45) Date of Patent: Feb. 17, 2026

(54) IVR SYSTEM TESTING USING INTERNET-ENABLED TELEPHONY DEVICES AND IN-COUNTRY DIALING

(71) Applicant: Cyara Solutions Pty Ltd, Hawthorn (AU)

(72) Inventors: Alok Kulkarni, Glen Iris (AU); Geoff Willshire, Greenslopes (AU); Thomas Fejes, Freshwater (AU); Matthew Lawlor, Cork (IE)

(73) Assignee: Cyara Solutions Pty Ltd, Hawthorn (AU)

( * ) Notice: Subject to any disclaimer, the term of this patent is extended or adjusted under 35 U.S.C. 154(b) by 0 days.

(21) Appl. No.: 18/599,713

(22) Filed: Mar. 8, 2024

(65) Prior Publication Data

US 2025/0037703 A1     Jan. 30, 2025

Related U.S. Application Data

(63) Continuation-in-part of application No. 18/406,479, filed on Jan. 8, 2024, now abandoned, which is a continuation of application No. 18/485,761, filed on Oct. 12, 2023, now abandoned, which is a continuation of application No. 17/091,370, filed on Nov. 6, 2020, now Pat. No. 11,790,886.

(51) Int. Cl.
| | |
|---|---|
| *H04M 3/28* | (2006.01) |
| *G06N 20/00* | (2019.01) |
| *G10L 15/01* | (2013.01) |
| *G10L 15/22* | (2006.01) |
| *G10L 15/26* | (2006.01) |
| *H04M 3/24* | (2006.01) |
| *H04M 3/493* | (2006.01) |

(52) U.S. Cl.
CPC .............. *G10L 15/01* (2013.01); *G06N 20/00* (2019.01); *G10L 15/22* (2013.01); *G10L 15/26* (2013.01); *H04M 3/24* (2013.01); *H04M 3/28* (2013.01)

(58) Field of Classification Search
CPC ............ H04M 3/28; H04M 3/24; G10L 15/22
See application file for complete search history.

(56) References Cited

U.S. PATENT DOCUMENTS

| | | | |
|---|---|---|---|
| 2007/0183405 A1* | 8/2007 | Bennett | H04L 65/1026 370/352 |
| 2009/0059906 A1* | 3/2009 | Cullen | H04L 12/2898 370/352 |
| 2009/0248415 A1 | 10/2009 | Jablokov et al. | |

(Continued)

OTHER PUBLICATIONS

Davidson, "Press, Cisco. Voice over IP Fundamentals.", published in 2000. (Year: 2000).*

(Continued)

*Primary Examiner* — Jialong He
(74) *Attorney, Agent, or Firm* — Boon Intellectual Property Law, PLLC; Brian S. Boon

(57) ABSTRACT

A system and method for testing interactive voice response (IVR) systems which combines automated test generation with in-country dialing, allowing for use of country codes within that country, dialing of free phone numbers in that country, and IVR testing using the same phone pathways that will be experienced by the customer during a customer's actual calls.

8 Claims, 17 Drawing Sheets

(56) References Cited

U.S. PATENT DOCUMENTS

| | | | | |
|---|---|---|---|---|
| 2009/0253420 | A1* | 10/2009 | Stewart | H04M 15/00 455/417 |
| 2010/0034198 | A1* | 2/2010 | Gan | H04L 12/66 455/445 |
| 2014/0050314 | A1* | 2/2014 | Croak | H04M 3/5125 379/265.12 |
| 2016/0050317 | A1 | 2/2016 | Natesan et al. | |
| 2016/0227034 | A1 | 8/2016 | Kulkarni et al. | |
| 2022/0051658 | A1 | 2/2022 | Krishnamoorthy et al. | |
| 2022/0148568 | A1* | 5/2022 | Kulkarni | G10L 15/22 |

OTHER PUBLICATIONS

Sinnreich, Henry, and Alan B. Johnston. Internet communications using SIP: Delivering VoIP and multimedia services with Session Initiation Protocol. John Wiley & Sons, 2012. (Year: 2012).*

\* cited by examiner

Fig. 6B

Results ← 610

- Data import starting
- Importing Services...
- All Services processed
- Importing blocks...
- All Blocks processed
- Importing Test Cases...
- 1800 ▮ 2020-10-16T05:30:22.220Z Joe.Bloggs
  - ⸬ Test Case Number 1: 1800 ▮ 2020-10-16T05:30:22.220Z Joe.Bloggs
  - ⸬ Folder path: \_Phone
  - ⸬ Call step StepNo 1
  - ⸬ Call step StepNo 2
  - ⸬ Call step StepNo 3
  - ⸬ Call step StepNo 4
  - ⸬ Call step StepNo 5
  - ⸬ Starting TestCase validation...
  - ⸬ Starting steps data validation
  - ⸬ Validating step at position 0
  - ⸬ Validating step at position 1
  - ⸬ Validating step at position 2
  - ⸬ Validating step at position 3
  - ⸬ Validating step at position 4
  - ⸬ Validating step at position 5
  - ⸬ Saving Test Case '1800' ▮ 2020-10-16T05:30:22.220Z Joe.Bloggs' to storage.
  - ○ Successfully imported Test Case 1800 ▮ 2020-10-16T05:30:22.220Z Joe.Bloggs
- All Test Cases processed

IVR SYSTEM TESTING USING INTERNET-ENABLED TELEPHONY DEVICES AND IN-COUNTRY DIALING

CROSS-REFERENCE TO RELATED APPLICATIONS

Priority is claimed in the application data sheet to the following patents or patent applications, each of which is expressly incorporated herein by reference in its entirety:
Ser. No. 18/406,479
Ser. No. 18/485,761
Ser. No. 17/091,370

BACKGROUND

Field of the Art

The disclosure relates to the field of computer systems, and more particularly to the field of automated test generation of interactive voice response systems.

Discussion of the State of the Art

Currently, the dominant method of testing interactive voice response (IVR) systems is manual testing by IVR testing personnel, whereby an IVR tester manually places a phone call to a client's IVR system, performs a specific sequence of voice or DTMF commands, records the results, and begins anew. Due to the time and cost requirement, it is estimated that less than ten percent of all possible scenarios are ever tested. Furthermore, because of the human element involved, errors in reporting can be frequent and if any change to the IVR system is implemented, all previous test cases must be performed again. This process is inefficient, costly, avoidably inaccurate, and untimely for IVR system providers. Automated testing systems exist, but their adoption is limited by the requirement for extensive programming knowledge to program the automated tests prior to deployment.

Further, IVR testing that uses a single country's telephony system to dial internet-enabled devices in other countries fails to replicate the phone pathways that will be experienced by customers during actual phone calls between those two countries.

What is needed is a system and method for testing of IVR systems using IVR test scenarios automatically generated from natural interactions with IVR systems along with the ability to test the IVR systems with calls routed through in-country telephony systems.

SUMMARY

Accordingly, the inventor has conceived, and reduced to practice, a system and method for testing interactive voice response (IVR) systems which combines automated test generation with in-country dialing, allowing for use of country codes within that country, dialing of free phone numbers in that country, and IVR testing using the same phone pathways that will be experienced by the customer during a customer's actual calls.

According to a preferred embodiment, a system for testing interactive voice response (IVR) systems is disclosed, comprising: a computing device comprising a memory and a processor; an IVR test case generator comprising a first plurality of programming instructions stored in the memory which, when operating on the processor, causes the computing device to: store test case data from a call initiated by a person to an IVR, the test case data comprising a spoken audio stream between a first internet-enabled telephony device located in a first country and a second internet-enabled telephony device located in a second country, and a phone number for one of the two internet-enabled telephony devices; transcribe the spoken audio stream into text using a speech-to-text engine; generate one or more test cases from the transcribed text; receive a call request from one of the internet-enabled telephony devices for connection to the other internet-enabled telephony device via the phone number; route the call through a telephone system in the second country using a phone web server located in the second country.

According to another preferred embodiment, a method for testing interactive voice response (IVR) methods is disclosed, comprising the steps of: a computing device comprising a memory and a processor; using an IVR test case generator comprising a first plurality of programming instructions stored in a memory of, and operating on a processor of, a computing device to: store test case data from a call initiated by a person to an IVR, the test case data comprising a spoken audio stream between a first internet-enabled telephony device located in a first country and a second internet-enabled telephony device located in a second country, and a phone number for one of the two internet-enabled telephony devices; transcribe the spoken audio stream into text using a speech-to-text engine; generate one or more test cases from the transcribed text; receive a call request from one of the internet-enabled telephony devices for connection to the other internet-enabled telephony device via the phone number; route the call through a telephone system in the second country using a phone web server located in the second country.

According to an aspect of an embodiment, the test case data further comprises dual-tone multi-frequency (DTMF) signals, and the one or more test cases are generated from the transcribed text and the DTMF signals.

According to an aspect of an embodiment, the phone number is associated with the second internet-enabled telephony device and the call originates from the first internet-enabled telephony device to the second internet-enabled telephony device using the phone number.

According to an aspect of an embodiment, the phone number is associated with the first internet-enabled telephony device and the call originates from the second internet-enabled telephony device to the first internet-enabled telephony device using the phone number.

According to an aspect of an embodiment, the call is routed by the phone web server located in the second country using one or more of the following routing parameters: type of network, country, call type, and telephony provider.

According to an aspect of an embodiment, a VoIP gateway located between the first internet-enabled telephony device and the phone web server is configured to convert analog signals from analog calls into digital data so that the call can be sent through a router over a network.

According to an aspect of an embodiment, a VoIP gateway located between the first internet-enabled telephony device and the phone web server is configured to record audio from the call, keeping server-side audio and user-side audio separate.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

FIG. 6B is a block diagram illustrating another aspect of an exemplary user interface for an IVR test case generator.

Figure 8:
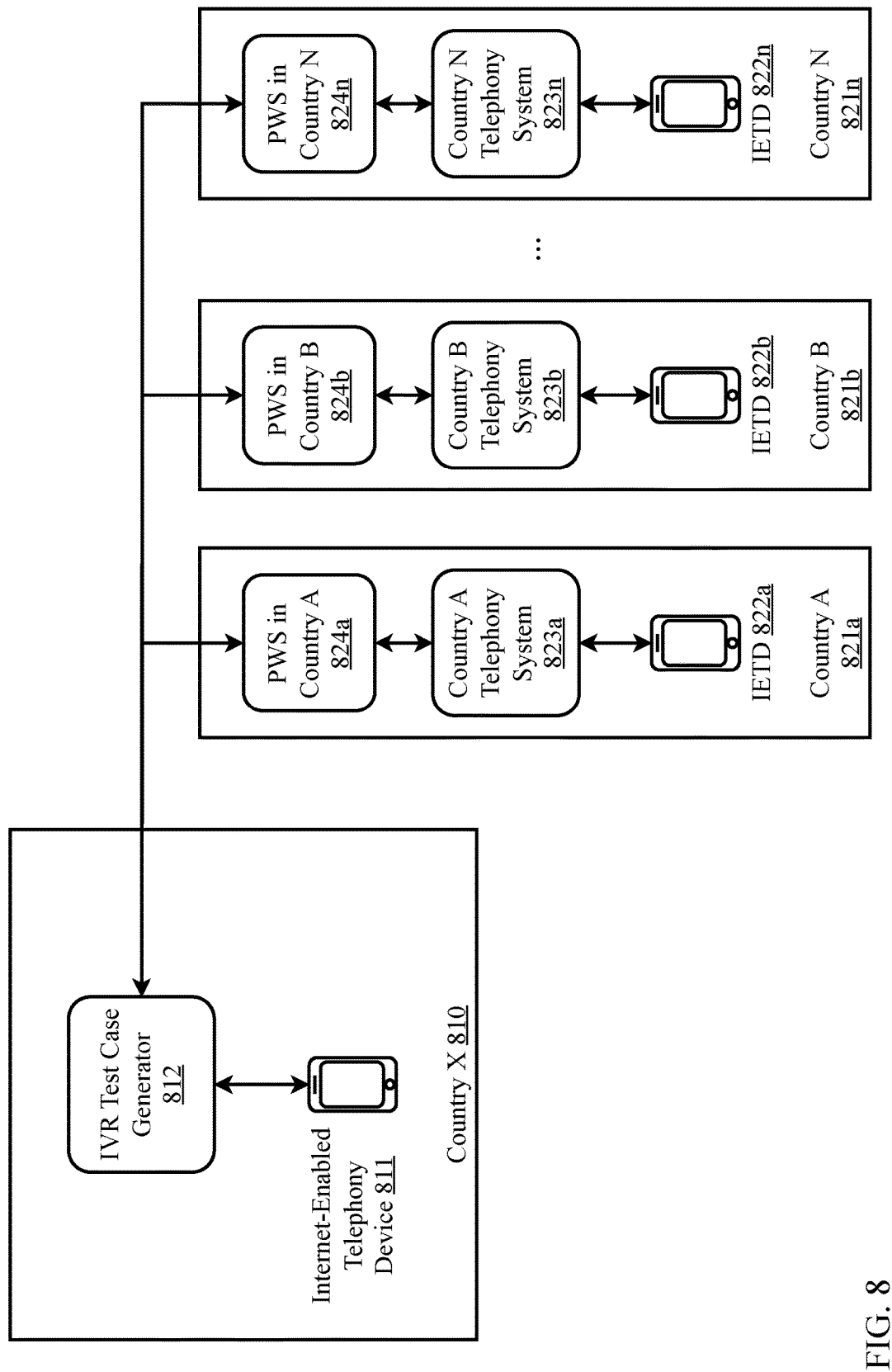

FIG. 8 a diagram showing an alternate exemplary embodiment of an IVR test case generator using an in-country dialing configuration.

Figure 9:
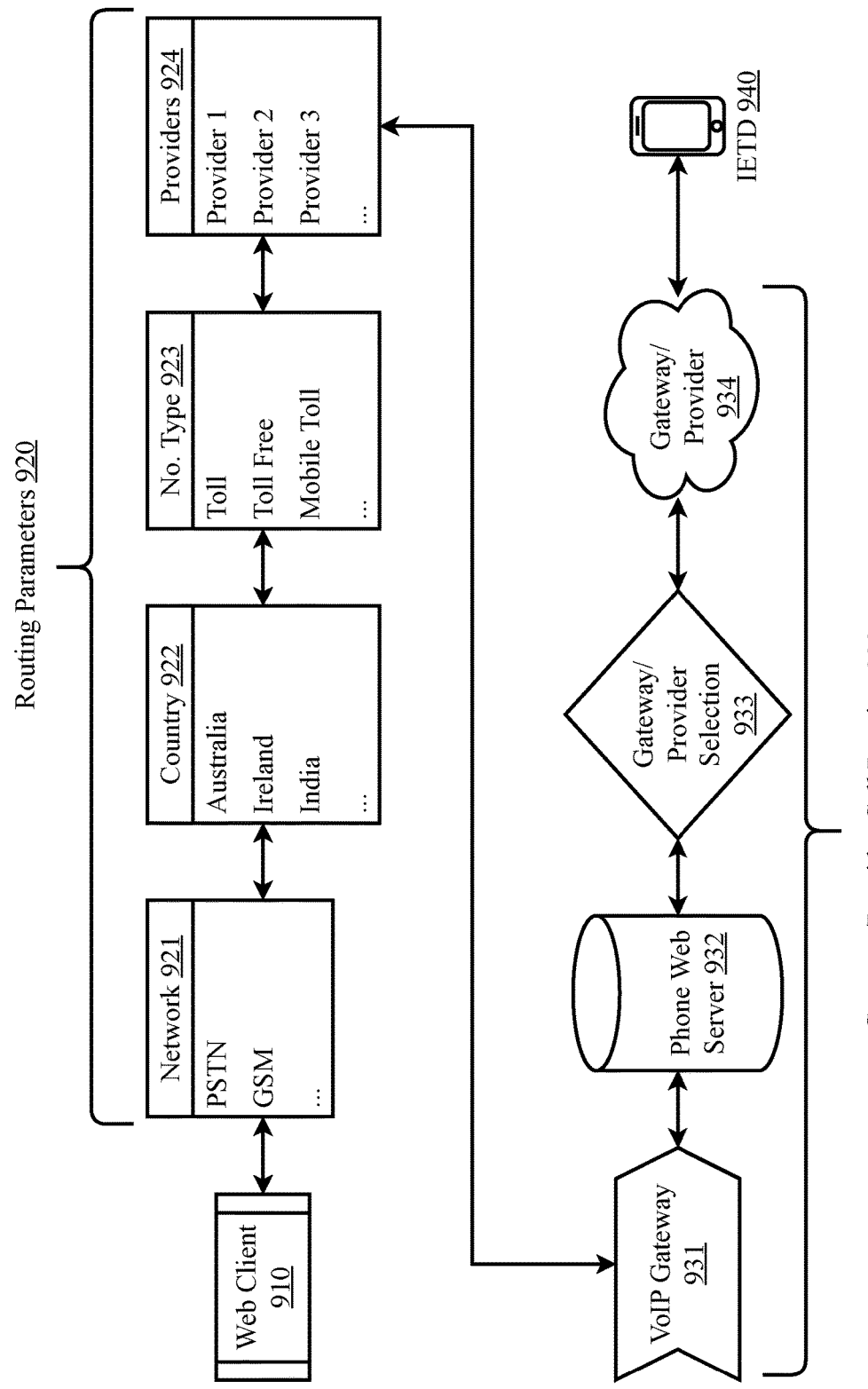

FIG. 9 is a diagram showing an exemplary telephony provider selection configuration for an IVR test case generator using an in-country dialing configuration.

Figure 10:
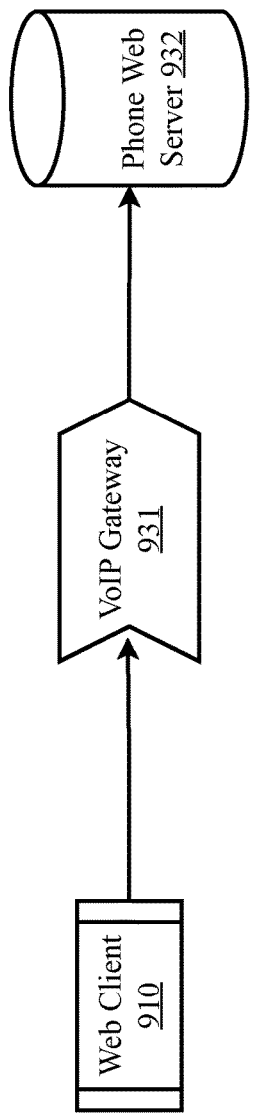

FIG. 10 is a diagram showing an exemplary call origination configuration for an IVR test case generator.

Figure 11:
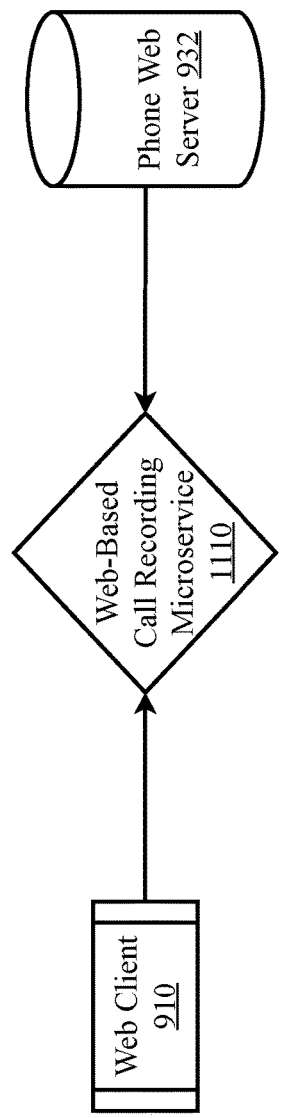

FIG. 11 is a diagram showing an exemplary call recording configuration for an IVR test case generator.

Figure 12:
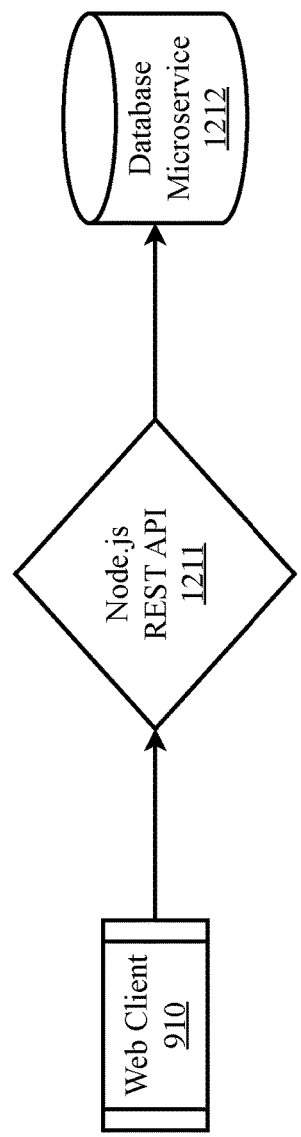

FIG. 12 is a diagram showing an exemplary database update configuration for an IVR test case generator using REST APIs.

Figure 13:
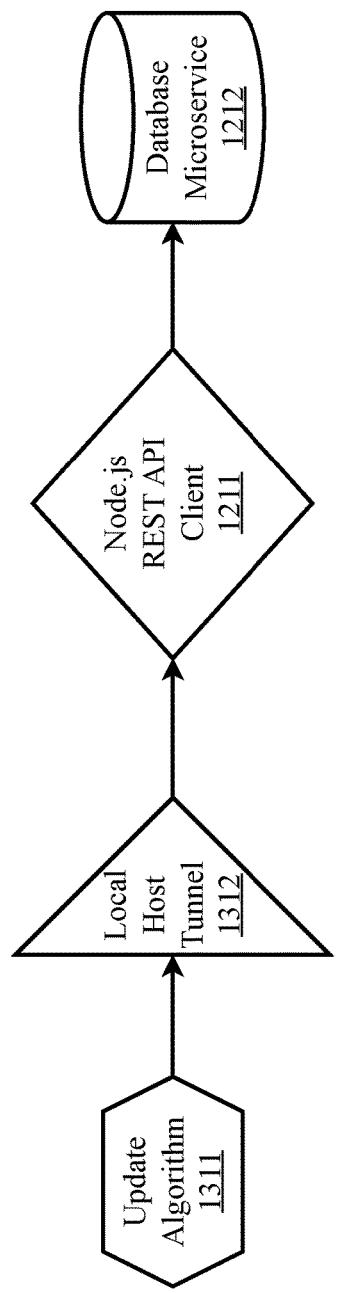

FIG. 13 is a diagram showing an exemplary database update configuration for an IVR test case generator using an update algorithm that accesses REST APIs through a local host tunnel.

Figure 14:
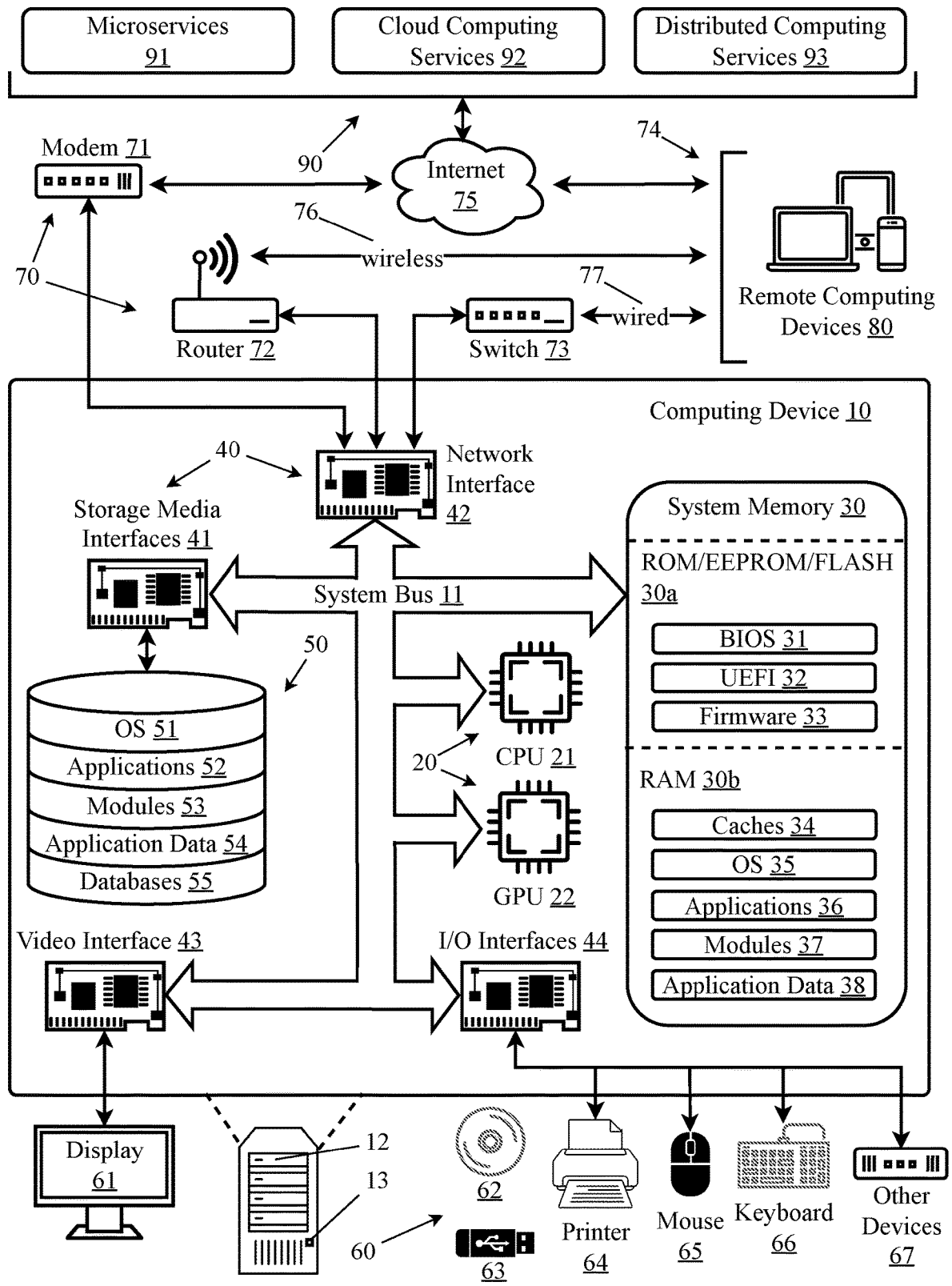

FIG. 14 illustrates an exemplary computing environment on which an embodiment described herein may be implemented.

DETAILED DESCRIPTION

The inventor has conceived, and reduced to practice, a system and method for testing interactive voice response (IVR) systems which combines automated test generation with in-country dialing, allowing for use of country codes within that country, dialing of free phone numbers in that country, and IVR testing using the same phone pathways that will be experienced by the customer during a customer's actual calls.

An IVR tester uses a telephony device (website, mobile app, VoIP, etc.) and an automated IVR test case generator to place test calls to an IVR system. The automated IVR test case generator intercepts and collects the phone call's audio stream, dual-tone multi-frequency signals, and available metadata (e.g., response times, post-speech silence timeout, etc.). Once the call is complete, the automated IVR test case generator pre-populates a webpage or other user-interface technology and a database with the audio stream, dual-tone multi-frequency signals, and available metadata from the test scenario phone call. The IVR tester may then save that test scenario and continue to the next scenario. The saved scenario may now be used automatically by the IVR test case generator for regression testing or duplicated and edited for use in other systems.

There are two primary methods that can be used for web-based international dialing, out-of-country dialing and in-country dialing. Out-of-country dialing has the benefit of centralization, wherein servers can be located in a single host country and used to dial internet-enabled telephony devices in other countries. The disadvantage of out-of-country dialing is that the telephony system of the host country is used, which means that certain country codes can't be used, free phone numbers can't be dialed, the phone pathway from the testing device to the device under test is different, so it doesn't reflect the exact customer experience under test. In-country dialing fixes all of the disadvantages of out-of-country dialing, but requires phone web servers in each country to which test calls are made, increasing the networking burden of the operator of the testing system. However, for operators of testing systems with the resources to handle the increased networking burden, the benefits of in-country dialing are substantial, providing testing of the exact system experienced by customers. Using the same phone pathways used by the customer allows for more accurate testing of the customer telephony experience, as differences in technologies (e.g., PSTN or SIP), equipment, number of intermediate connections, and other factors can significantly affect call audio quality, call latency, call disconnections, and other factors affecting the customer's telephony experience. Where test calls are being made within a given country in which the IVR test case generator and its phone web servers are located, the out-of-country and in-country configurations described herein aren't necessary, as the telephony system of that given country will already reflect the actual customer experience for calls made within that country.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

DETAILED DESCRIPTION OF DRAWING FIGURES

Figure 1:
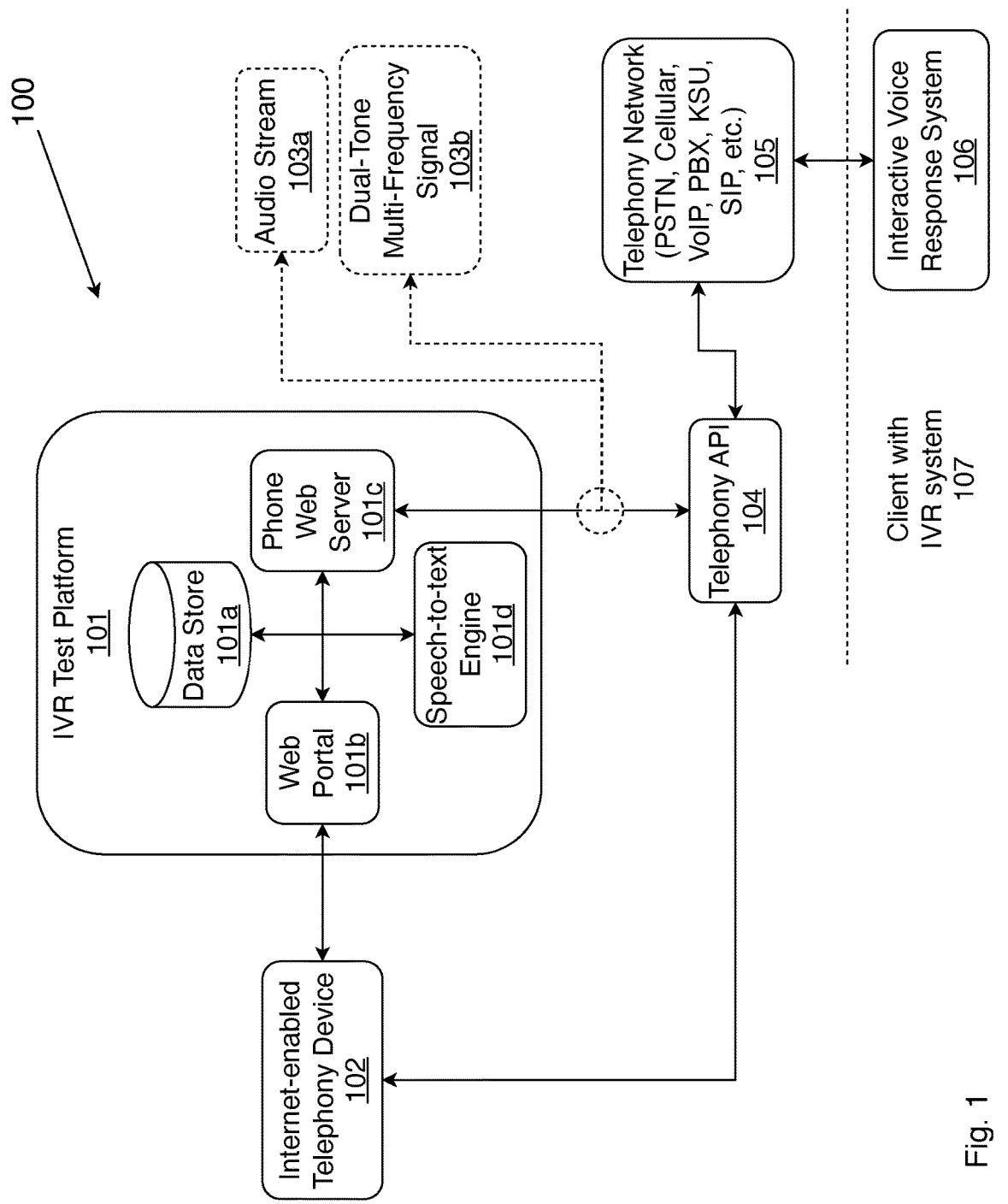
FIG. 1 is a block diagram illustrating an exemplary system architecture for an IVR test case generator.

FIG. 1 is a block diagram illustrating an exemplary system architecture 100 for an IVR test case generator 101. According to one embodiment, an IVR test case generator 101 comprises a data store 101a, a web portal 101b, a phone web server 101c, and a speech-to-text engine 101d. The IVR test case generator 101 enables an IVR tester, a person whose job it is to test scenarios of a company's IVR system, to create and save test scenarios that may be used later to automatically perform regression testing or cross-client templates.

An IVR tester uses a internet-enabled telephony device 102 such as a landline phone, wireless phone, satellite phone, VoIP phone, analog-to-digital phone, misc Internet-enabled device, etc. with at least a phone-like interface or physical buttons which include a number pad and dial and hang up options. Other internet-enabled telephony devices 102 may include software-based phones such as ones in a web browser, website, mobile app, mobile device, desktop software, and other embodiments known to those in the art. The internet-enabled telephony device 102 is connected with the IVR test case generator's web portal 101b and a telephony application programming interface (API) 104. The connection between the internet-enabled telephony device 102 and web portal 101b may be accomplished by APIs, software agents, hardware taps, conference calling, or by calling an intermediary phone number that passively or actively facilitates the connection, or other means by which to connect telephone calls to a network-connected resource. According to one embodiment, the internet-enabled telephony device 102 may be hosted on the web portal 101b and require a user to login with credentials which create authentication cookies that can be used to call a telephony API 104. This is one example, however many combinations of telephony devices, cybersecurity measures, and APIs exist such that a person with ordinary skill in the art can easily work out any number of embodiments.

According to one embodiment, an IVR tester logs into the web portal 101b via a web browser and is presented with a graphical user interface (GUI) internet-enabled telephony device 102. The IVR tester dials the client's 107 IVR system 106 and begins to perform the desired test scenario. During the test scenario call, a phone web server 101c intercepts the audio stream 103a and any number pad presses known as dual-tone multi-frequency signals 103b. According to one aspect, the DTMF signals 103b provide the IVR test case generator 101 with the number dialed and the numbers input during the call. Additional examples comprise the interception or collection of audio 103a and DTMF signals 103b directly from the internet-enabled telephony device 102, web portal 101b, or by API calls 104, or via telephony network 105. The legacy public switched telephone network (PSTN) is one example of a telephony network. Other telephony networks may be involved such as VoIP, PBX, KSU, SIP, and other landline, wireless networks, and unified communications known in the art.

According to one embodiment, audio 103a and DTMF signals 103b intercepted are processed by a speech-to-text engine 101d which transcribes the audio but may also detect post-speech silence timeout, which is how many seconds of silence the IVR system 106 detects before responding. The speech-to-text engine 101d, or another speech analysis engine in other embodiments, may be used to detect the language of the speaker, any dialect of the speaker, and differentiate between the IVR tester and the IVR system voices.

According to one embodiment, when the test scenario phone call is complete or terminated, the IVR test case generator 101 presents the IVR tester with a New Test Case webpage that is pre-populated with data from the web portal 101b (e.g., the IVR tester's information, connection status, etc.), the phone web server 101c (e.g., raw audio stream 103a, DTMF tones 103b, number dialed, menu options chosen, length of call, etc.), and the speech-to-text engine 101d (e.g., audio transcript, language and dialect, prompts and replies, time information, etc.). In this embodiment, the New Test Case webpage may be presented in the same web portal 101b as the GUI internet-enabled telephony device 102 from which the IVR tester may review and edit the pre-populated information, choose a name for which to save the test scenario as, and save.

With the new test scenario and all of the associated data saved to a data store 101a, the IVR tester can perform a new and different test case. The IVR test case generator 101 can then be configured to perform the saved test case on its own without a human for regression testing.

Various embodiments may implement aspects such as caller ID, phone number spoofing, auto-redial, language translation, profanity filter, cloud-based storage, cloud-based processing, and other cloud-based services. Saved test cases may be used as templates to create new test scenarios. These may be used for the same or new client IVR systems. Some embodiments may provide a marketplace to sell templates or packages of IVR test scenarios to interested parties.

Figure 2:
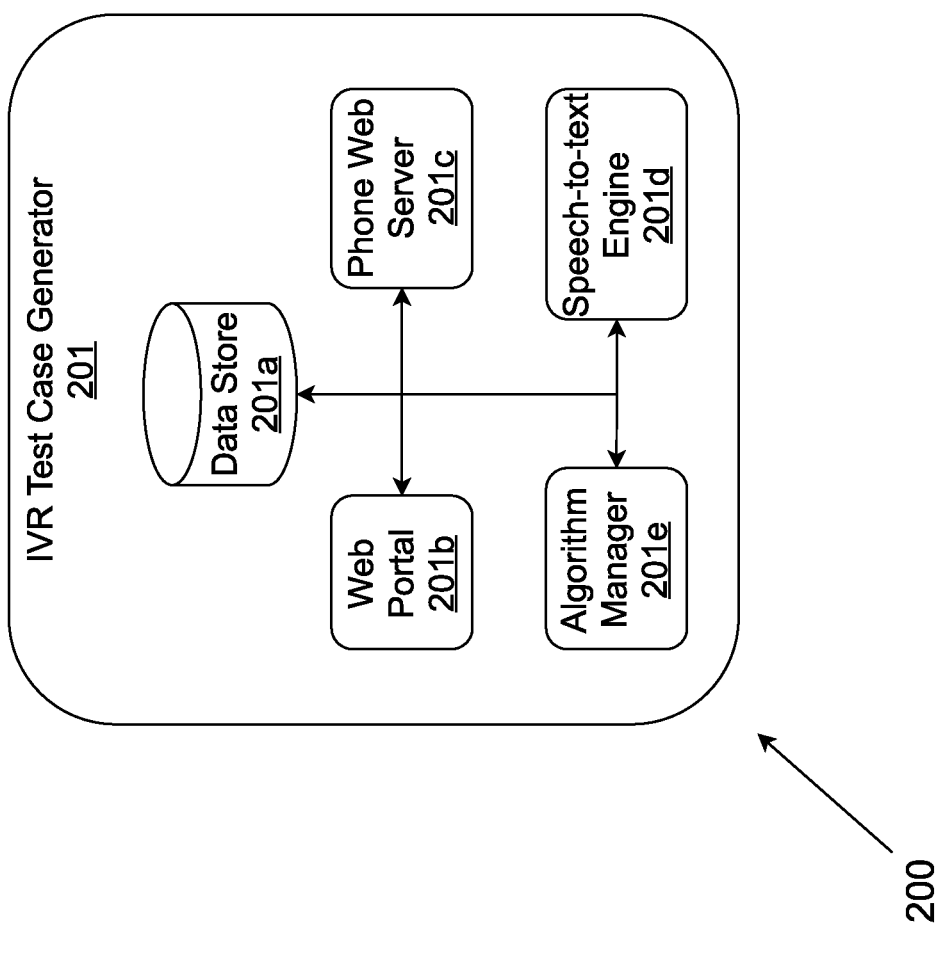
FIG. 2 is a block diagram illustrating an exemplary system architecture for an IVR test case generator using computer algorithms.

FIG. 2 is a block diagram illustrating an exemplary system architecture 200 for an IVR test case generator 201 using computer algorithms. According to one embodiment, the IVR test case generator 201 comprises the same aspects (201a-201d) of the IVR test case generator 101 (101a-101d) from FIG. 1 with the addition of an algorithm manager 201e.

According to one embodiment, the algorithm manager 201e comprises machine-learning algorithms that generate synthesized IVR tester conversations. Machine learning algorithms may generate verbatim test case scenarios in different languages or dialects. Other machine learning algorithms may slightly alter the order of words, replace words with synonyms or commonly misused words, or generate wholly new interactions from ingesting large data sets.

Another embodiment comprises the use of standard combinational algorithms to generate IVR test scenarios using every combination of DTMF signals 103b. This significant aspect allows the client to have nearly one hundred percent of possible test cases tested without the need and cost of a human. According to another embodiment, an IVR test case generator 201 may comprise combinational algorithms, machine-learning algorithms, and human generated test cases and any combination thereof to provide the largest possible test case database.

Additional embodiments may include the purposeful generation of incorrect voice or DTMF signals so as to test the cybersecurity of a client's IVR system. Approaches of machine-learning algorithms may comprise graph analysis, ontological models, supervised learning, unsupervised learning, reinforcement learning, semi-supervised learning, self-supervised learning, multi-instance learning, inductive learning, deductive learning, transductive learning, generative adversarial networks, deep learning, shallow learning, and other types of machine-learning models not mentioned here.

DETAILED DESCRIPTION OF EXEMPLARY ASPECTS

Figure 3:
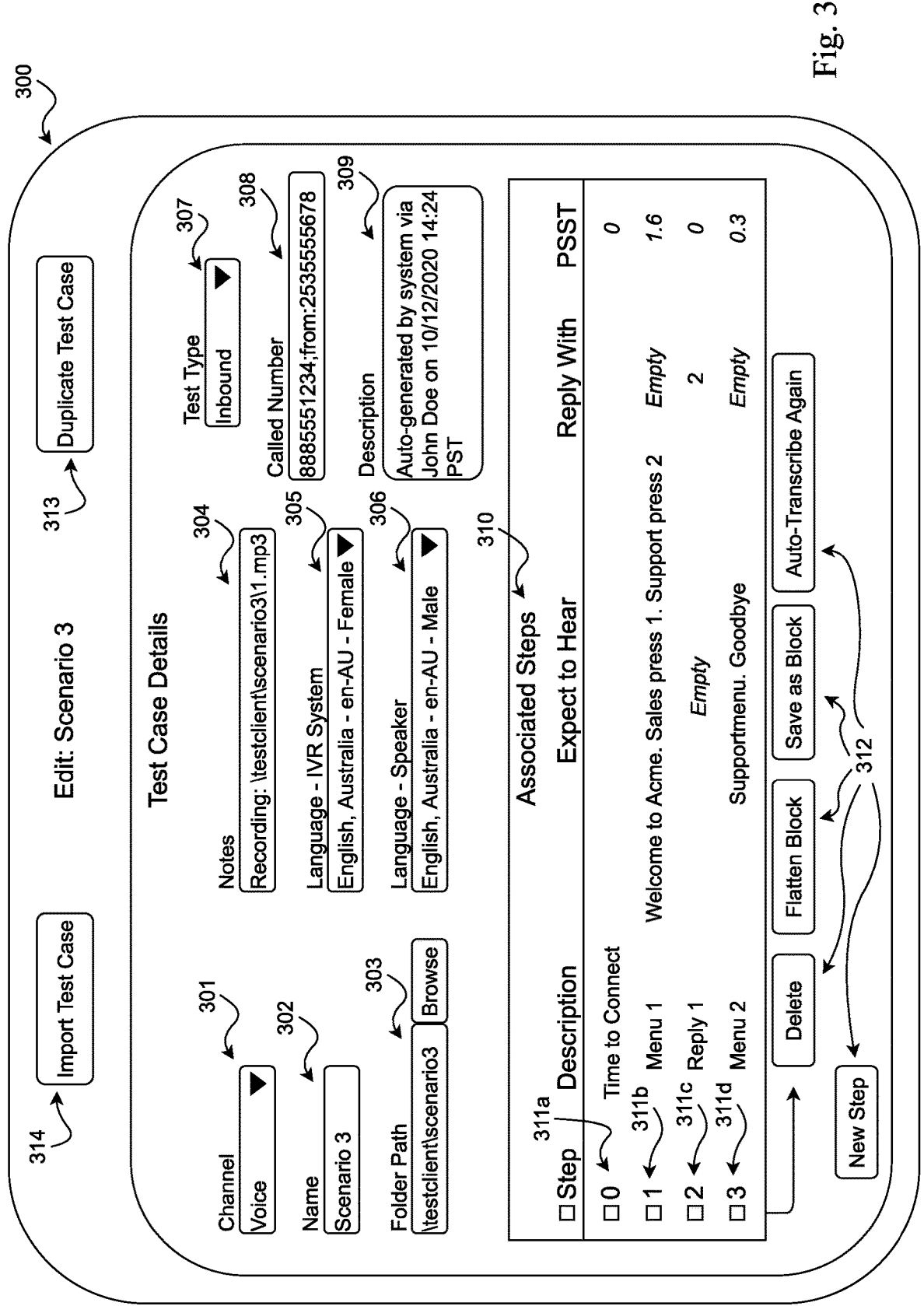
FIG. 3 is a block diagram illustrating one aspect of an exemplary user interface for an IVR test case generator.

FIG. 3 is a block diagram illustrating an exemplary user interface 300 for an IVR test case generator, according to one aspect. The user interface 300 in this aspect of an embodiment is generated and presented to an IVR tester after completion of a test scenario phone call to a client's IVR system. Data intercepted, collected, and generated from an IVR test case generator is pre-populated into the user interface 300. Pre-populated fields include the channel 301, test scenario name 302, folder path 303, notes 304, IVR system language 305, IVR tester language 306, test type 307, origin and destination phone numbers 308, and description 309. The IVR tester may edit or add to any of these fields such as renaming 302 the scenario, changing the folder path 303, or changing the channel 301 from voice to DTMF as a few examples.

A speech analysis engine, such as an advanced speech-to-text engine according to one embodiment, pre-populates the steps detected from the associated test phone call 310. Steps may be determined by first logging the time to connect as Step 0 310a. Then associating each block of responses from either the IVR tester or the IVR system with a new step 311b-311d. The IVR tester may employ a series of standard editing features 312 to alter the associated steps 310 to correct or better fit the test case with the desired scenario. IVR testers or IVR test case generator administrators may duplicate test cases 313 for cross-client, cross-IVR system, or regression testing. Additionally, test cases may be imported 314 from XML files, API streams, or other formats capable of text, audio, and data storage.

This user interface is just one example of a plurality of features that an embodiment may utilize. Other embodiments of a user interface may comprise more items, e.g., a map displaying the IVR and user locations, charts and graphs showing trends or other aspects related to the IVR testing process, or less items, e.g., comprising only a name 302 and save location 303. The combination of UI elements is trivial to those with ordinary skill in the art where any number of combinations may be manifested.

Figure 4:
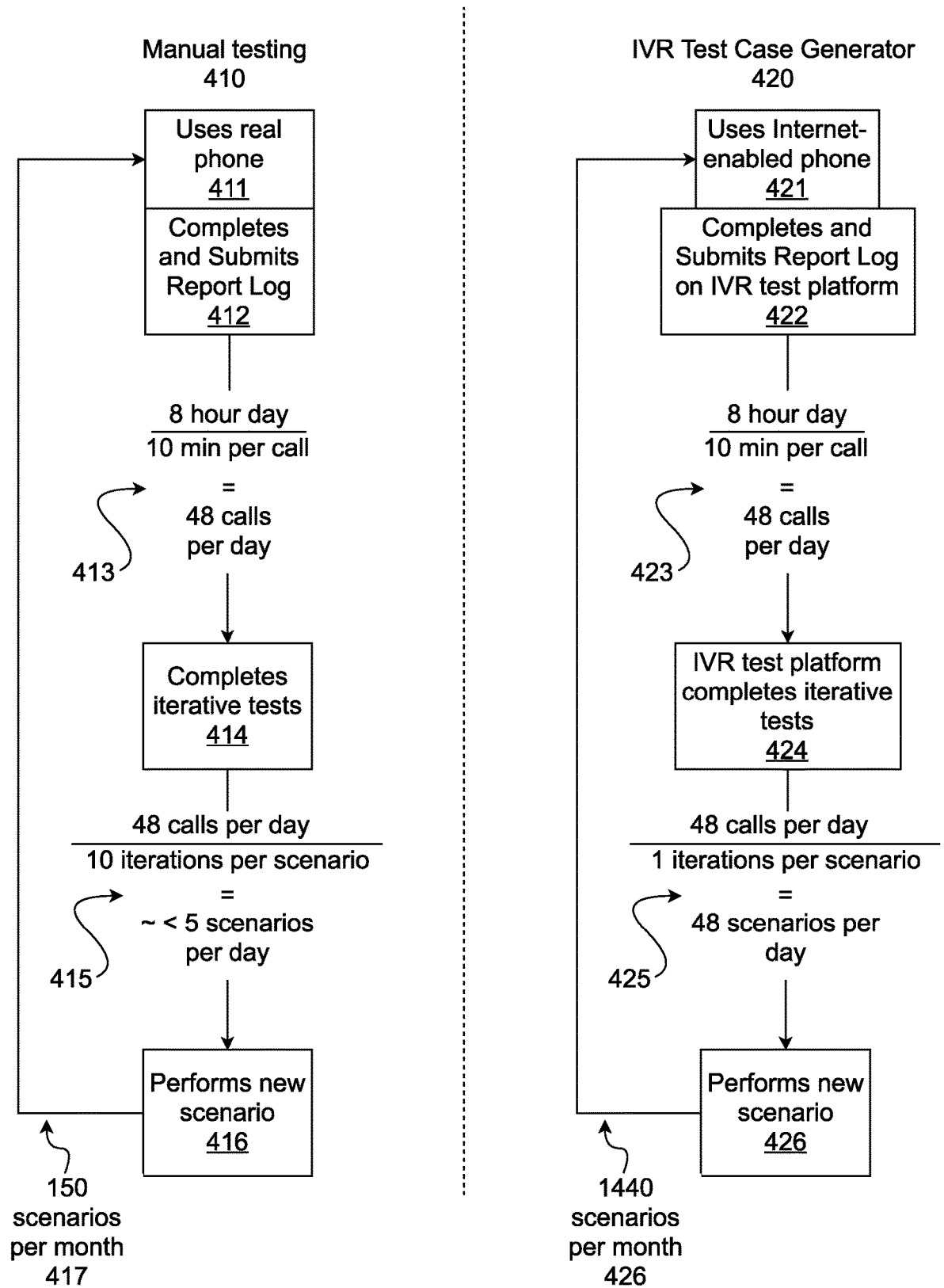
FIG. 4 is a flow diagram illustrating a comparative analysis between IVR testing methods.

FIG. 4 is a flow diagram illustrating a comparative analysis between IVR testing methods. This flow diagram demonstrates the practical use of an IVR test case generator. According to one embodiment, manual testing methods 410 comprise manual dialing 411 and reporting of each test call 412. If we assume five minutes per call and five minutes to at least log the results, we arrive at ten minutes per call for forty-eight calls per typical workday 413. Because IVR testing relies on an average, and to account for outliers, IVR testers normally perform at least ten iterations of each scenario 414. Before an IVR tester can move on to a new scenario 416, he or she performs the standard ten iterations 414 for an approximate average of less than five scenarios per day 415. If an IVR tester completes at least 5 scenarios per day, that is at most one hundred and fifty scenarios per month 417.

Employing an IVR test case generator 420 has many advantages over manual testing 410 methods. When the IVR tester calls an IVR system 421, the raw audio and DTMF tones may be captured and used to pre-populate a more detailed, more accurate, and more timely report 422 than a manual report 412. The IVR tester still makes his or her forty-eight calls per day 423, however each call is a new scenario 426 as the IVR test case generator takes over iterative calls 424 after the first one is completed. This exemplary method allows for forty-eight scenarios per day 425 which leads to one-thousand four hundred and forty scenarios per month 426.

The calculations in this diagram only account for testing one IVR system with no changes throughout the entire month of testing. Should even one aspect of the IVR system change, all tests will need to be performed again. This is called regression testing and costs companies using IVR systems substantial time and money to perform manually. Automated testing dramatically reduces this cost by automatically testing systems not directly affected by the changes. For changed portions of the IVR saved test scenarios may still be used by editing (one at a time or in batches) the details of the scenario, as laid out in FIG. 3.

If an IVR system's menu has one initial menu with six options, six subsequent menus each with three options, and an IVR tester wants to try each number DMTF tone, it will take at least fifty-six calls or at most one hundred and twenty-two if star and pound DTMF tones are used, or two hundred and six using all available DTMF tones. If each scenario needs ten iterations, that is two thousand and sixty phone calls. This is the significance of an IVR test case generator.

Figure 5:
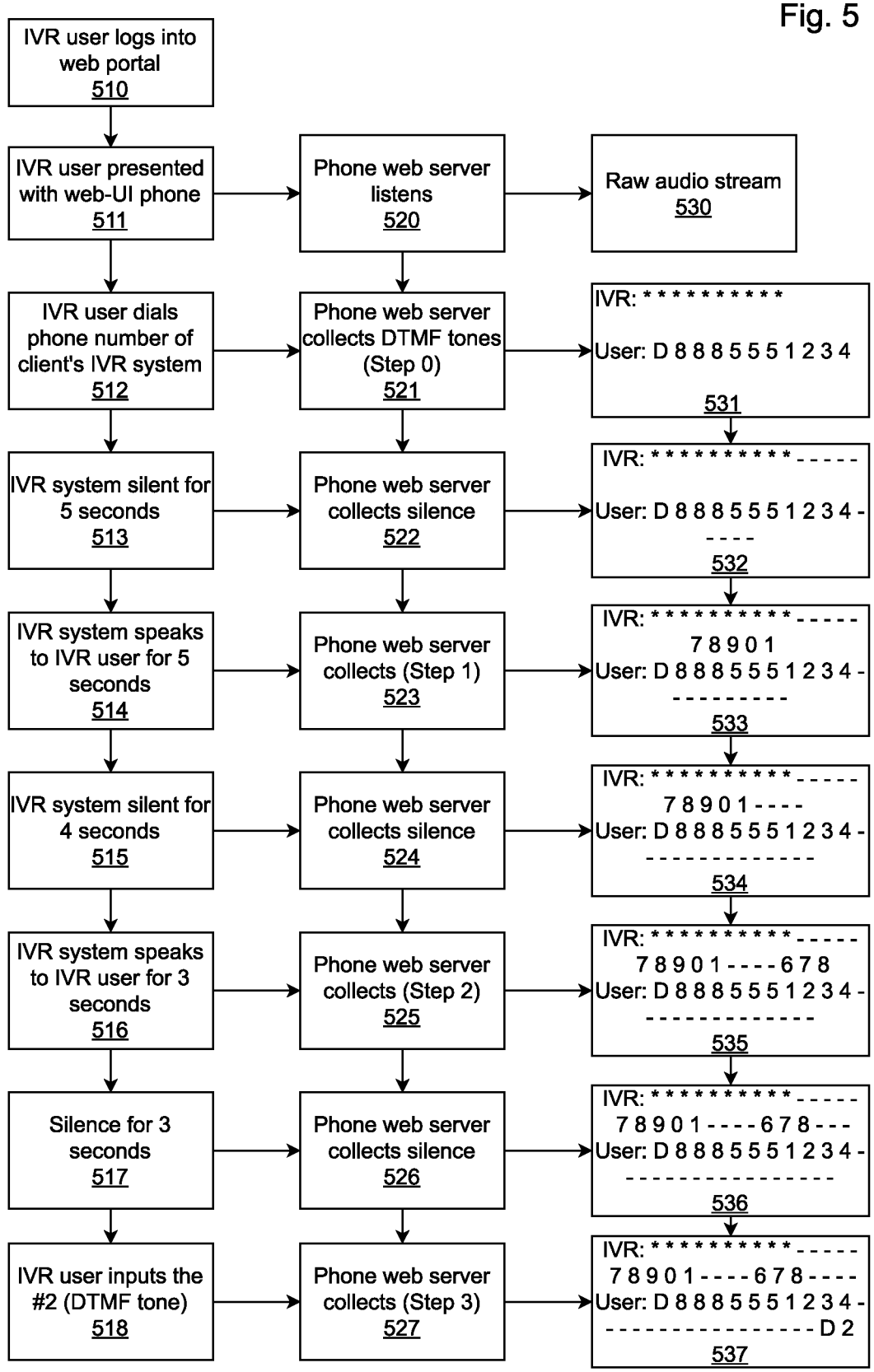
FIG. 5 is a flow diagram illustrating an example use case of an IVR test case generator using an exemplary method, according to one aspect.

FIG. 5 is a flow diagram illustrating an example use case of an IVR test case generator using an exemplary method, according to one aspect. According to one embodiment, this example is twenty seconds of IVR audio with DTMF input. Each dash in the figure represents one second of silence, an asterisk symbol denotes no data (typically from no connection), and each digit represents one second of speech and its value is the end of each second modulo ten, unless preceded by the character D, which denotes the successive digits are DMTF tones.

The example begins when an IVR tester, also referred to as a user, logs into the web portal 510 of an IVR test case generator. The user is then presented a web-UI number pad with at least an option to dial and hang up. Other embodiments may include number-spoofing, call waiting, auto-redial, and other commonly known telephony technologies. Any number of preceding menus, options, or authentication techniques may exist between the IVR user logging in and the IVR user being presented the web-UI phone 511.

As the user is presented the web-UI 511, the phone web server begins to listen 520 and record the raw audio stream 530. The user then dials the IVR system's phone number 512 where the DMTF tones are recorded 531 and the IVR test case generator records this as step 0 521. The phone web server records two sequences of numbers, one for the IVR system and the other for the user 531. The two sequences at this point began when the user dialed the phone number 512 (888-555-1234) that is represented by eleven seconds of no data from the IVR system, because it has not picked up the line, and by a D followed by the numbers dialed in the user's sequence.

After the IVR system picks up the call, there is a five second delay 513 before the IVR system greets the user and prompts him or her to make a choice, which takes five seconds 514. The phone web server collects both the silence 522 and the IVR system's speech which because of the silence, also interprets this as step 1 523. The phone web server data sequences now include the five seconds of silence 532 and five seconds of speech 533.

The IVR system now awaits the user's response for three seconds and upon hearing no response at the beginning of second four 515, tells the user to try again which takes three seconds 516. Both the silence 524 and IVR system's speech 525 are collected. The silence is stored as dashes 534 and the speech is stored as digits 535. After three seconds of silence 517 (that is also recorded 526, 536) the user clicks or presses the number two 518 which sends the appropriate DTMF signal and is recorded by the phone web server 537 as step 3 527.

These symbols and digits are one method of collecting and interpreting voice and DTMF signals during an IVR system test call. These symbols and digits may be used to pre-populate fields in an IVR test case generator. Many embodiments are possible, and this is only one exemplary method of data capture. Persons with ordinary skill in the art may appreciate many techniques of data capture possible for the implementation of an IVR test case generator.

Figure 6A:
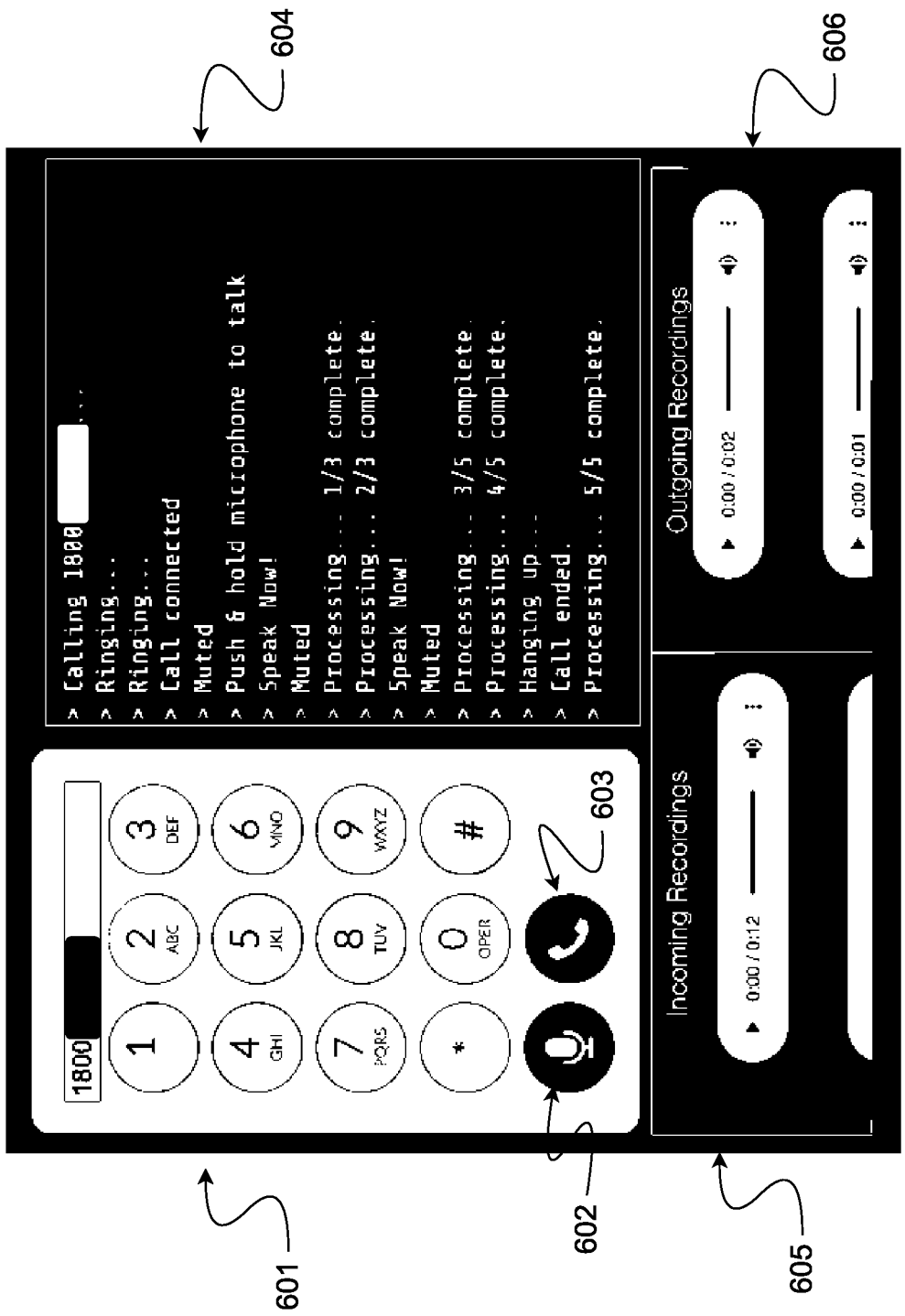
FIG. 6A is a block diagram illustrating another aspect of an exemplary user interface for an IVR test case generator.
Figure 6C:
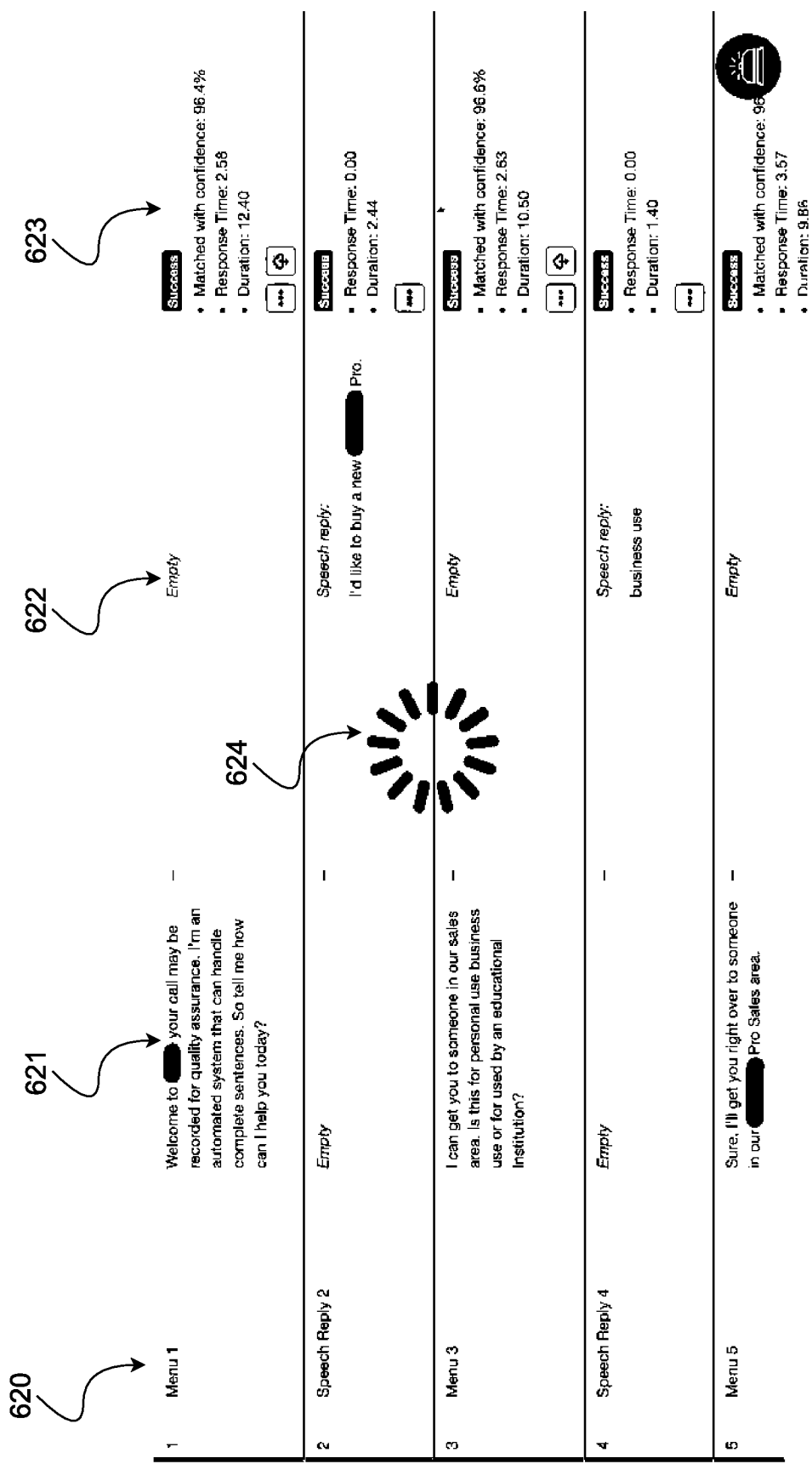
FIG. 6C is a block diagram illustrating another aspect of an exemplary user interface for an IVR test case generator.
Figure 6D:
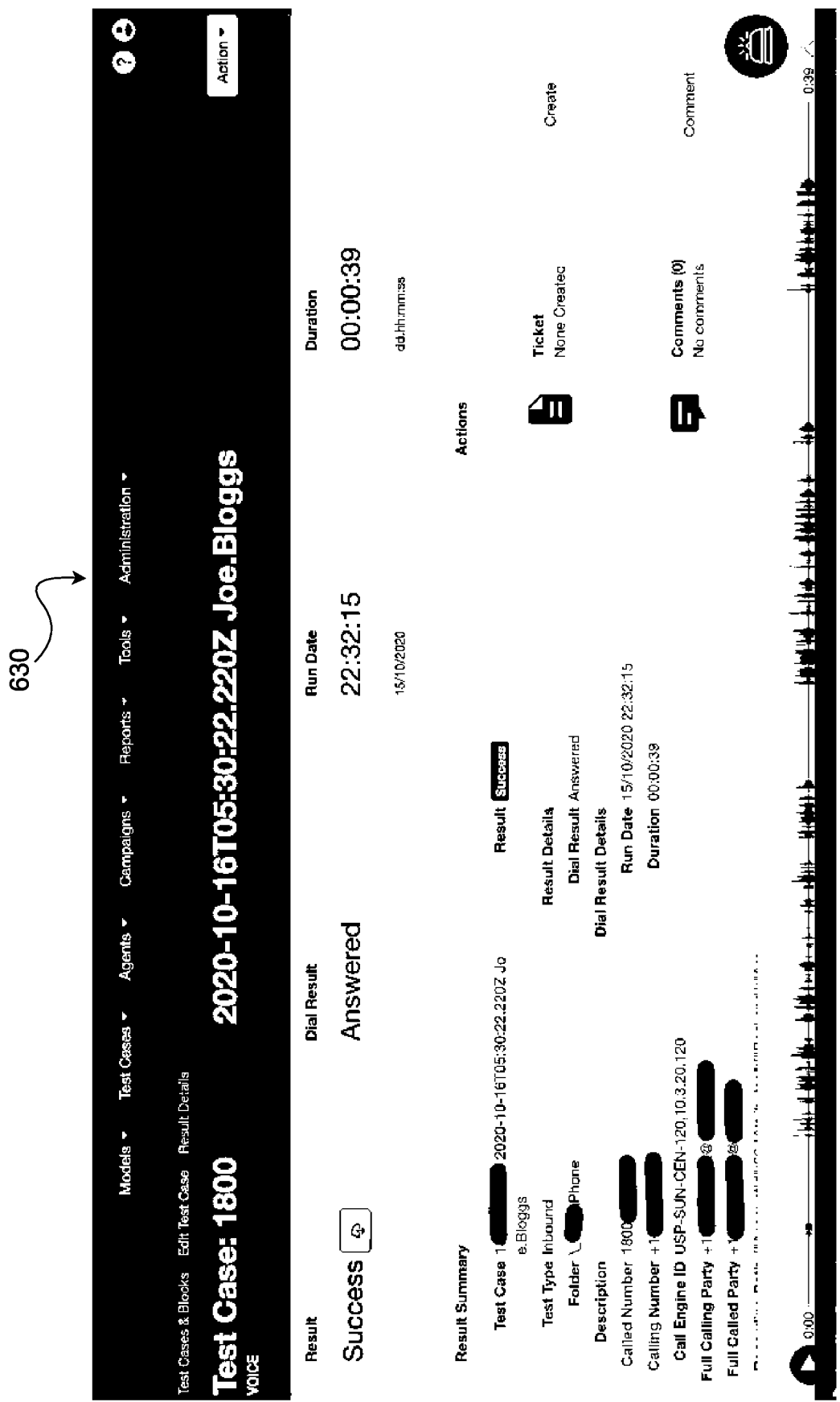
FIG. 6D is a block diagram illustrating another aspect of an exemplary user interface for an IVR test case generator.

FIG. 6 is a block diagram illustrating another aspect of an exemplary user interface for an IVR test case generator. The information contained herein and in subsequent figures (FIG. 6A-FIG. 6D) are from a real-world call placed between the inventor(s) and a test IVR system.

According to one embodiment, a software application operating on a computing device may comprise a dialing pad 601 to include a push-to-talk (PTT) 602 and a dial/hang-up button 603. The user interface (UI) may further comprise a call log 604 which displays the status, instructions, and steps being recorded by the IVR test case generator. When audio from the user (outgoing 606) or IVR system (incoming 605) is detected, it is recorded, saved, and made available for download. According to one embodiment, the information from the call log 604, the IVR system audio 605, and user audio 606 are automatically stored in a data store, hard disk, RAM, or any other computer storage device.

FIG. 6B is a block diagram illustrating another aspect of an exemplary user interface for an IVR test case generator. This diagram illustrates the results 610 of the automated processing by the IVR test case generator after a call is completed. The results screen 610 displayed which informs a user that the system has successfully imported the data, if any step was not validated correctly, and then proceeds the user to the next screen, according to one embodiment.

In another embodiment, users may edit data if not transcribed or imported correctly as described in FIG. 3. Upon editing and verifying the imported data, users may choose to run an automated test iteration. The recorded test scenario is now available for all future test iterations. According to another aspect, saved test scenarios may be used to generate new test scenarios by changing responses or DTMF tones or by altering the previous test in such a way that the alteration yields a different test scenario.

FIG. 6C is a block diagram illustrating another aspect of an exemplary user interface for an IVR test case generator. This diagram is displayed to a user while the automated test is being performed automatically by the IVR test case generator. The screen comprises a column showing the steps 620, columns for the transcribed audio question/statement 621 and response 622, and a column for various metrics such as success or failure, transcription confidence rate, response time, duration, additional options, and download link 623. Some embodiments comprise waiting animations 624 used for showing that the call is in progress or other typical wait functions known in the computing industry.

FIG. 6D is a block diagram illustrating another aspect of an exemplary user interface for an IVR test case generator. According to this aspect, a screen displaying the results of the automated IVR test case is shown 630. IVR testing personnel may now use this verified test case to automatically perform future iterations of this test case. User do not necessarily need to initiate the automated test cases. The IVR test case generator may be configured to perform regression testing at specified intervals or triggered when an IVR system implements a change.

Figure 7:
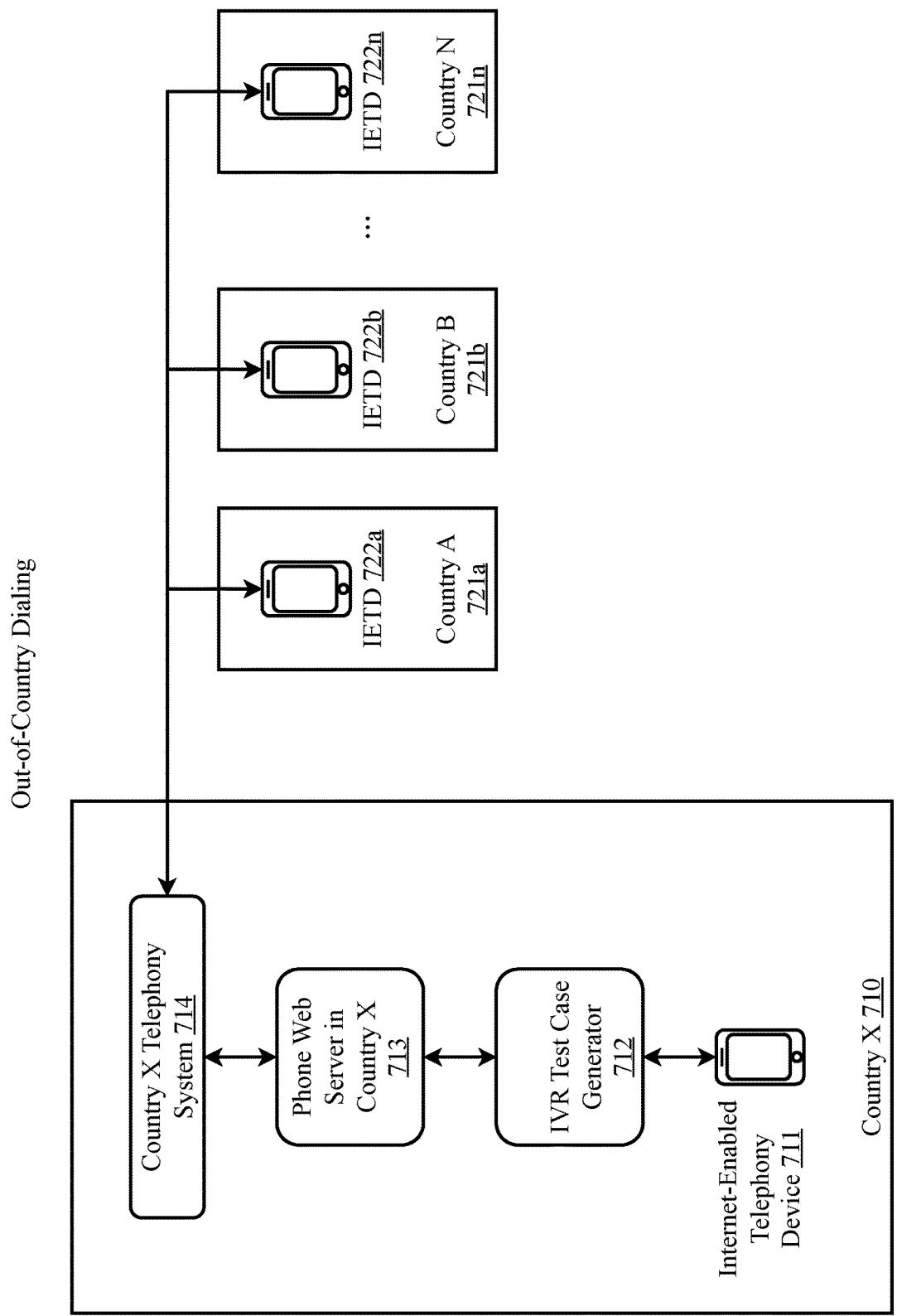
FIG. 7 is a diagram showing an alternate exemplary embodiment of an IVR test case generator using an out-of-country dialing configuration.

FIG. 7 is a diagram showing an alternate exemplary embodiment of an IVR test case generator using an out-of-country dialing configuration. There are two primary methods that can be used for web-based international dialing, out-of-country dialing and in-country dialing. Out-of-country dialing has the benefit of centralization, wherein servers can be located in a single host country and used to dial internet-enabled telephony devices in other countries. The disadvantage of out-of-country dialing is that the telephony system of the host country is used, which means that certain country codes can't be used, free phone numbers can't be dialed, the phone pathway from the testing device to the device under test is different, so it doesn't reflect the exact customer experience under test. In-country dialing fixes all of the disadvantages of out-of-country dialing, but requires phone web servers in each country to which test calls are made, increasing the networking burden of the operator of the testing system. However, for operators of testing systems with the resources to handle the increased networking burden, the benefits of in-country dialing are substantial, providing testing of the exact system experienced by customers. Using the same phone pathways used by the customer allows for more accurate testing of the customer telephony experience, as differences in technologies (e.g., PSTN or SIP), equipment, number of intermediate connections, and other factors can significantly affect call audio quality, call latency, call disconnections, and other factors affecting the customer's telephony experience. Where test calls are being made within a given country in which the IVR test case generator and its phone web servers are located, the out-of-country and in-country configurations described herein aren't necessary, as the telephony system of that given country will already reflect the actual customer experience for calls made within that country.

In this exemplary embodiment, out-of-country dialing is shown, wherein test calls are made using an internet-enabled telephony device 711 located in a first country (in this example, Country X 710) to (or from, depending on the testing protocol) one or more internet-enabled telephony devices 722a-n in one or more second countries 721a-n (in this example, Country A 721a, Country B 721b, through Country N 721n). In this configuration, an IVR test case generator 712 is located in Country X 710, and one or more phone web servers 713 are also located in Country X 710.

IVR test case generator 712 comprises the characteristics and functionality previously described for IVR test case generator 101, 201 in addition to the functionality described in this FIG. 7. Internet-enabled telephony device 711 comprises the characteristics and functionality previously described for internet-enabled telephony device 102 in addition to the functionality described in this FIG. 7. The phone web servers 812 comprise the characteristics and functionality previously described for phone web server 101c in addition to the functionality described in this FIG. 7.

The internet-enabled telephone device 711 may operate "web phone" software which allows it to communicate with call servers such as phone web server 713, which communications may be made through an SIP gateway such as Janus SIP Gateway. The "web phone" software may comprise a web client which facilitates the communications through established internet telephony protocols. The "web phone" software may also track and record interactions made between a user and the call server (e.g., DTMF tones or audio transmissions), gathering data for automated IVR testing by IVR test case generator 712.

The phone web server 713 acts as a soft telephony switch to route calls from the internet-enabled telephony device 711 through the telephony system 714 of Country X 710. The phone web server 713 may be a cloud-based telephony software such as the open-source FreeSWITCH, which provides real-time communications protocols using audio, video, and text, and which supports WebRTC, VoIP, video transcoding, Multipoint Control Unit (MCU), and Session Initiation Protocol (SIP) functionality. The phone web server 713 can be used to test IVRs locally, having predefined IVRs with default prompts and multi-level IVR interaction capabilities. It can further act as a call server to make outbound calls from a web client (e.g., operating as part of an internet-enabled telephony device 711) to (or from, depending on the testing protocol) a remote internet-enabled telephony device 721a-n via a telephony system 714.

The telephony system of Country X 714 connects via web protocols with the one or more internet-enabled telephony devices 722a-n. This exemplary embodiment provides centralization, in that phone web servers 713 are required only in the host country, Country X 710, but routes calls through that country's telephony system 714, thus having the limitations for out-of-country dialing described above. Note that IVR test case generator 712 does not necessarily have to be located in the same country as the phone web servers 713, and may be cloud-based (for example, distributed across computing services in multiple countries) or located in a different country while still interacting with phone web servers in country.

FIG. 8 a diagram showing an alternate exemplary embodiment of an IVR test case generator using an in-country dialing configuration. There are two primary methods that can be used for web-based international dialing, out-of-country dialing and in-country dialing. Out-of-country dialing has the benefit of centralization, wherein servers can be located in a single host country and used to dial internet-enabled telephony devices in other countries. The disadvantage of out-of-country dialing is that the telephony system of the host country is used, which means that certain country codes can't be used, free phone numbers can't be dialed, the phone pathway from the testing device to the device under test is different, so it doesn't reflect the exact customer experience under test. In-country dialing fixes all of the disadvantages of out-of-country dialing, but requires phone web servers in each country to which test calls are made, increasing the networking burden of the operator of the testing system. However, for operators of testing systems with the resources to handle the increased networking burden, the benefits of in-country dialing are substantial, providing testing of the exact system experienced by customers. Using the same phone pathways used by the customer allows for more accurate testing of the customer telephony experience, as differences in technologies (e.g., PSTN or SIP), equipment, number of intermediate connections, and other factors can significantly affect call audio quality, call latency, call disconnections, and other factors affecting the customer's telephony experience. Where test calls are being made within a given country in which the IVR test case generator and its phone web servers are located, the out-of-country and in-country configurations described herein aren't necessary, as the telephony system of that given country will already reflect the actual customer experience for calls made within that country.

In this exemplary embodiment, in-country dialing is shown, wherein test calls are made using an internet-enabled telephony device 811 located in a first country (in this example, Country X 810) to (or from, depending on the testing protocol) one or more internet-enabled telephony devices 822*a-n* in one or more second countries 821*a-n* (in this example, Country A 821*a*, Country B 821*b*, through Country N 821*n*). In this configuration, an IVR test case generator 812 is located in Country X 810. However, the phone web servers 824*a-n* are located in the countries 821*a-n* to which calls are being made.

IVR test case generator 812 comprises the characteristics and functionality previously described for IVR test case generator 101, 201 in addition to the functionality described in this FIG. 8. Internet-enabled telephony device 811 comprises the characteristics and functionality previously described for internet-enabled telephony device 102 in addition to the functionality described in this FIG. 8. The phone web servers 812 comprise the characteristics and functionality previously described for phone web server 101*c* in addition to the functionality described in this FIG. 8.

The internet-enabled telephone device 811 may operate "web phone" software which allows it to communicate with call servers such as phone web server 813, which communications may be made through an SIP gateway such as Janus SIP Gateway. The "web phone" software may comprise a web client which facilitates the communications through established internet telephony protocols. The "web phone" software may also track and record interactions made between a user and the call server (e.g., DTMF tones or audio transmissions), gathering data for automated IVR testing by IVR test case generator 812.

The phone web servers 824*a-n* act as a soft telephony switches to route calls from the internet-enabled telephony device internet-enabled telephony device 811 in Country X 810 to the internet-enabled telephony devices 822*a-n* in each of the second countries 821*a-n*. The phone web server 813 may operate telephony software such as the cloud-based, open-source FreeSWITCH, which provides real-time communications protocols using audio, video, and text, and which supports WebRTC, VoIP, video transcoding, Multipoint Control Unit (MCU), and Session Initiation Protocol (SIP) functionality. The phone web server 813 can be used to test IVRs locally, having predefined IVRs with default prompts and multi-level IVR interaction capabilities. It can further act as a call server to make outbound calls from a web client (e.g., operating as part of an internet-enabled telephony device 811) to (or from, depending on the testing protocol) a remote internet-enabled telephony device 821*a-n* via a telephony system 823*a-n*.

The IVR test case generator 812 instructs the phone web server 824*a-n* of each second country 821*a-n* to route a call through that country's telephone system 823*a-n* to an internet-enabled telephony device 822*a-n* in that country. The telephony system of each second country 821*a-n* connects via web protocols with the one or more internet-enabled telephony devices 822*a-n* in that country. This exemplary embodiment has the advantages of allowing use of all country codes available to each respective country's telephony system 823*a-n*, dialing free phone numbers within each respective country 821*a-n* which is not generally possible when dialing from outside of the country, and uses the same phone pathways that would be used by customers dialing from Country X 810 to each of the second countries 821*a-n*, allowing for testing of the same telephony experience as would be experienced by the customer. Using the same phone pathways used by the customer allows for more accurate testing of the customer telephony experience, as differences in technologies (e.g., PSTN or SIP), equipment, number of intermediate connections, and other factors can significantly affect call audio quality, call latency, call disconnections, and other factors affecting the customer's telephony experience.

Note that IVR test case generator does not necessarily have to be located in the same country as the phone web servers, and may be cloud-based (for example, distributed across computing services in multiple countries) or located in a different country while still interacting with phone web servers in country.

FIG. 9 is a diagram showing an exemplary telephony provider selection configuration for an IVR test case generator using an in-country dialing configuration. To perform in-country dialing to replicate a customer telephony experience from an internet-enabled telephony device (IETD) in a first country to an IETD 940 in a second country via a particular telephony pathway, a web client (e.g., operating on the IETD originating the call) 910 may select one or more routing parameters 920 for the call, which parameters are used to route the call 930 via gateways and telephony switches 930 to the receiving IETD 940.

Routing parameters 920 may include, for example, choice of a type of telephone network through which to make the call (e.g., public switched telephone network (PSTN), global system for mobile communications (GSM), etc.), a country to which the call should be made (or from which the call should originate), a phone number type (e.g., toll call, toll free call, mobile toll call, etc.), a telephony service provider (e.g., AT&T, Vonage, T-Mobile, or any of their equivalents either domestically or internationally), and other such routing parameters.

After the routing parameters 920 have been selected, the call is routed via gateways and telephony switches 930. If the call originates from an older, analog phone system (e.g., an on-premise private branch exchange (PBX), the analog audio signal is first sent through a voice over Internet protocol (VoIP) gateway 931.

The VoIP gateway 931 is used as a proxy medium between web client and server. Where the call is analog, the VoIP gateway 931 converts the analog signal from the call into digital data that conforms with a particular VoIP protocol (e.g., the session initiation protocol (SIP) protocol) so that the call can be sent through a router over a network. In an embodiment, an SIP gateway such as a Janus WebRTC server configured as an SIP gateway is used as the VoIP gateway 931. Using an SIP gateway of this sort provides several advantages in terms of the system. It provides WebRTC signaling through HTTP protocol which increases the probability of compatibility of web clients operating in a larger number of browsers operating on a variety of computing devices. Further, handling of WebSocket Secure (WSS) connections is not necessary as in the case of other SIP protocols (e.g., SIP.js and certain other WebRTC-based JavaScript SIP libraries). Further, an SIP gateway of this sort records every call keeping server-side (peer) audio and user-side audio separate, which improves accuracy when analyzing and transcribing the separate audio signals. Certain other SIP protocols record calls only on the server (peer) side, which requires recording of calls in dual frequency and makes it difficult to identify and separate server-side (peer) and user-side audio from the dual-frequency audio stream.

A phone web server 932 may operate telephony software such as the cloud-based, open-source FreeSWITCH, which provides real-time communications protocols using audio, video, and text, and which supports WebRTC, VoIP, video transcoding, Multipoint Control Unit (MCU), and Session Initiation Protocol (SIP) functionality. The phone web server 932 provides telephony switching capabilities which select a gateway or provider 933 and route calls to and from the IETD 940 through the selected gateway or provider 934 based on the routing parameters 920.

FIG. 10 is a diagram showing an exemplary call origination configuration for an IVR test case generator. To perform in-country dialing to replicate a customer telephony experience from an internet-enabled telephony device (IETD) in a first country to an IETD in a second country via a particular telephony pathway, a web client (e.g., operating on the IETD originating the call) 910 may select one or more routing parameters for the call, which parameters are used to route the call via gateways and telephony switches to the receiving IETD.

The VoIP gateway 931 is used as a proxy medium between web client and server. Where the call is analog, the VoIP gateway 931 converts the analog signal from the call into digital data that conforms with a particular VoIP protocol (e.g., the session initiation protocol (SIP) protocol) so that the call can be sent through a router over a network. In an embodiment, an SIP gateway such as a Janus WebRTC server configured as an SIP gateway is used as the VoIP gateway 931. Using an SIP gateway of this sort provides several advantages in terms of the system. It provides WebRTC signaling through HTTP protocol which increases the probability of compatibility of web clients operating in a larger number of browsers operating on a variety of computing devices. Further, handling of WebSocket Secure (WSS) connections is not necessary as in the case of other SIP protocols (e.g., SIP.js and certain other WebRTC-based JavaScript SIP libraries). Further, an SIP gateway of this sort records every call keeping server-side (peer) audio and user-side audio separate, which improves accuracy when analyzing and transcribing the separate audio signals. Certain other SIP protocols record calls only on the server (peer) side, which requires recording of calls in dual frequency and makes it difficult to identify and separate server-side (peer) and user-side audio from the dual-frequency audio stream.

A phone web server 932 may operate telephony software such as the cloud-based, open-source FreeSWITCH, which provides real-time communications protocols using audio, video, and text, and which supports WebRTC, VoIP, video transcoding, Multipoint Control Unit (MCU), and Session Initiation Protocol (SIP) functionality. The phone web server 932 provides telephony switching capabilities which select a gateway or provider and route calls to and from the in-country IETD through the selected gateway or provider based on the routing parameters.

FIG. 11 is a diagram showing an exemplary call recording configuration for an IVR test case generator. To record audio during a call, a web-based call recording microservice 1110 records audio from the user-side web client (e.g., operating on the IETD originating the call) 910 and from the server-side (peer) from the phone web server 932.

As previously described, this recording may be accomplished via the VoIP gateway 931. The VoIP gateway 931 is used as a proxy medium between web client and server. Where the call is analog, the VoIP gateway 931 converts the analog signal from the call into digital data that conforms with a particular VoIP protocol (e.g., the session initiation protocol (SIP) protocol) so that the call can be sent through a router over a network. In an embodiment, an SIP gateway such as a Janus WebRTC server configured as an SIP gateway is used as the VoIP gateway 931. Using an SIP gateway of this sort provides several advantages in terms of the system. It provides WebRTC signaling through HTTP protocol which increases the probability of compatibility of web clients operating in a larger number of browsers operating on a variety of computing devices. Further, handling of WebSocket Secure (WSS) connections is not necessary as in the case of other SIP protocols (e.g., SIP.js and certain other WebRTC-based JavaScript SIP libraries). Further, an SIP gateway of this sort records every call keeping server-side (peer) audio and user-side audio separate, which improves accuracy when analyzing and transcribing the separate audio signals. Certain other SIP protocols record calls only on the server (peer) side, which requires recording of calls in dual frequency and makes it difficult to identify and separate server-side (peer) and user-side audio from the dual-frequency audio stream.

FIG. 12 is a diagram showing an exemplary database update configuration for an IVR test case generator using REST APIs. To update a database during a call, a web client (e.g., operating on the IETD originating the call) 910 accesses a node of a representational state transfer (REST) application programming interface (API) client 1211 providing data for updating of calls in a database. The web client 910 requests information about records in the database or sends instructions to update information, and the REST API 1211 returns the state of that record in the database in a standard format or updates the record as instructed. REST APIs are convenient because they are scalable and independent of the web client architecture, meaning that changes can be made to the web client without also changing the REST API.

The database is used to store test case details for use by IVR test case generator. For example, records in the database may store a dialed number, timestamp, call status (e.g., dialing, connecting, connected, call ended), DTMF events, and transcriptions of calls, all of which may be retrieved by IVR test case generator for IVR testing as described above. A convenient data structure for such records is JavaScript Object Notation, although other data structures may be used. In this example, the database is a cloud-based database microservice 1212 which provides advantages in terms of Internet accessibility and on-demand scalability. The database updates may be used to update call transcription data from a locally-hosted update algorithm, as described below.

FIG. 13 is a diagram showing an exemplary database update configuration for an IVR test case generator using an update algorithm that accesses REST APIs through a local host tunnel. Here, a locally-hosted algorithm performs some work on data obtained from a call. For example, the algorithm may convert recorded audio files in ".mjr" format into codec based ".opus" format, or may convert ".opus" files into ".wav" format files, or may transcribe text from such files using a text-to-speech analyzer. The locally-hosted algorithm then updates a database (in this case the database microservice 1212) by accessing a node of a representational state transfer (REST) application programming interface (API) client 1211 through a local host tunnel 1312. A local host tunnel such as Ngrok may be used. Ngrok is a public tunnel library which allows creation of publicly accessible tunnels which can be accessed from anywhere having an Internet connection. Updating via local host tunnels may not be necessary in some configurations.

Exemplary Computing Environment

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92.

Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for testing interactive voice response (IVR) systems, comprising:
    a computing device comprising a memory and a processor;
    three or more phone web servers physically located in different countries from one another;
    an IVR test case generator comprising a first plurality of programming instructions stored in the memory which, when operating on the processor, causes the computing device to:
        store test case data from a call initiated by a person to an IVR, the test case data comprising a spoken audio stream between a first internet-enabled telephony device physically located in a first country of the different countries and a second internet-enabled telephony device physically located in a second country of the different countries, and a phone number for the second internet-enabled telephony device;

transcribe the spoken audio stream into text using a speech-to-text engine;

generate one or more test cases from the transcribed text;

receive a call request from the first internet-enabled telephony device for connection to the second internet-enabled telephony device via the phone number; and replicate a customer telephony experience by allowing the person to dial a free phone number in the second country, wherein the call is routed through a call pathway from a telephone system in the first country to a telephone system in the second country using a phone web server located in the second country, the pathway being determined by all of the following routing parameters: type of network, country, call type, and telephony provider.

2. The system of claim 1, wherein the test case data further comprises dual-tone multi-frequency (DTMF) signals, and the one or more test cases are generated from the transcribed text and the DTMF signals.

3. The system of claim 1, further comprising a VoIP gateway located between the first internet-enabled telephony device and the phone web server configured to convert analog signals from analog calls into digital data so that the call can be sent through a router over a network.

4. The system of claim 1, further comprising a VoIP gateway located between the first internet-enabled telephony device and the phone web server configured to record audio from the call, keeping server-side audio and user-side audio separate.

5. A method for testing interactive voice response (IVR) methods, comprising the steps of:

physically locating three or more phone web servers in different countries from one another;

using an IVR test case generator comprising a first plurality of programming instructions stored in a memory of, and operating on a processor of, a computing device to perform the steps of:

storing test case data from a call initiated by a person to an IVR, the test case data comprising a spoken audio stream between a first internet-enabled telephony device physically located in a first country of the different countries and a second internet-enabled telephony device physically located in a second country of the different countries, and a phone number for one of the two internet-enabled telephony devices;

transcribing the spoken audio stream into text using a speech-to-text engine;

generating one or more test cases from the transcribed text;

receiving a call request from the first internet-enabled telephony devices for connection to the second internet-enabled telephony device via the phone number; and replicating a customer telephony experience by allowing the person to dial a free phone number in the second country, wherein the call is routed through a call pathway from a telephone system in the first country to a telephone system in the second country using a phone web server located in the second country, the pathway being determined by all of the following routing parameters: type of network, country, call type, and telephony provider.

6. The method of claim 5, wherein the test case data further comprises dual-tone multi-frequency (DTMF) signals, and the one or more test cases are generated from the transcribed text and the DTMF signals.

7. The method of claim 5, further comprising the step of using a VoIP gateway located between the first internet-enabled telephony device and the phone web server to convert analog signals from analog calls into digital data so that the call can be sent through a router over a network.

8. The method of claim 5, further comprising the step of using a VOIP gateway located between the first internet-enabled telephony device and the phone web server to record audio from the call, keeping server-side audio and user-side audio separate.

* * * * *